US008294864B2

United States Patent
Itou

(10) Patent No.: US 8,294,864 B2
(45) Date of Patent: Oct. 23, 2012

(54) LIQUID CRYSTAL DISPLAY DEVICE COMPRISING A COMMON ELECTRODE WITH A PLURALITY OF SLITS HAVING FIRST AND SECOND STRETCHING DIRECTIONS THAT DIFFER

(75) Inventor: Osamu Itou, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 121 days.

(21) Appl. No.: 13/028,378

(22) Filed: Feb. 16, 2011

(65) Prior Publication Data
US 2011/0216280 A1 Sep. 8, 2011

(30) Foreign Application Priority Data
Mar. 5, 2010 (JP) .................................. 2010-048492

(51) Int. Cl.
*G02F 1/1343* (2006.01)
(52) U.S. Cl. .......................... 349/141; 349/142; 349/143
(58) Field of Classification Search .......... 349/123–130, 349/132, 134, 140–143
See application file for complete search history.

(56) References Cited

U.S. PATENT DOCUMENTS
2004/0125296 A1* 7/2004 Sasabayashi ................. 349/129
2007/0195250 A1 8/2007 Onogi et al.
2008/0018845 A1* 1/2008 Choi .............................. 349/143
2008/0143939 A1* 6/2008 Adachi et al. ................. 349/114
2009/0251654 A1* 10/2009 Itou et al. ...................... 349/141

FOREIGN PATENT DOCUMENTS
JP 2007-256905 10/2007
* cited by examiner

*Primary Examiner* — Mark Robinson
*Assistant Examiner* — Paul Lee
(74) *Attorney, Agent, or Firm* — Antonelli, Terry, Stout & Kraus, LLP.

(57) ABSTRACT

To solve lowering of transmittance due to a pixel end domain, provided is a liquid crystal display device, including: a liquid crystal layer; and a substrate including pixel electrodes and, a common electrode disposed between the pixel electrodes and the liquid crystal layer and having a slit which stretches over adjacent pixel electrodes, in which: the slit has a first stretching direction at a center of one pixel electrode, and a second stretching direction in a gap between two adjacent pixel electrodes, different from the first stretching direction; in the slit, a portion where the first stretching direction is switched to the second stretching direction is located on one pixel electrode; and, with respect to an alignment direction, a first azimuth toward the first stretching direction and a second azimuth toward the second stretching direction have the same rotation direction, and the second azimuth is larger than the first azimuth.

6 Claims, 16 Drawing Sheets

LIQUID CRYSTAL DISPLAY DEVICE COMPRISING A COMMON ELECTRODE WITH A PLURALITY OF SLITS HAVING FIRST AND SECOND STRETCHING DIRECTIONS THAT DIFFER

CROSS-REFERENCE TO RELATED APPLICATION

The present application claims priority from Japanese patent application JP 2010-048492 filed on Mar. 5, 2010, the content of which is hereby incorporated by reference into this application.

BACKGROUND OF THE INVENTION

1. Field of the Invention

The present invention relates to a liquid crystal display device and, in particular, a technology effectively applied to in-plane switching (IPS) liquid crystal display devices.

2. Description of the Related Art

In liquid crystal display devices that are mounted to portable electronic devices such as cell phones and digital cameras, the number of pixels is increasing progressively and the areal dimensions per pixel tend to decrease accordingly. On the other hand, the demand for high image quality is still strong, and those liquid crystal display devices are required to balance high image quality and high pixel count. Major factors that give a liquid crystal display device high image quality are brightness, contrast ratio, and viewing angle.

An IPS liquid crystal display device has, in each pixel, an electrode that is characterized by being shaped in a stripe pattern in plan view, and drives a liquid crystal layer by applying an electric field whose major components are parallel to the substrate plane (so-called lateral electric field) to the liquid crystal layer. When no electric field is applied, the liquid crystal layer of the IPS liquid crystal display device has a homogenous alignment in which the long axis direction (molecular axis direction) of liquid crystal molecules is substantially parallel to the substrate plane. Applying a voltage causes a change in the liquid crystal layer that rotates the alignment substantially within the substrate plane. Excellent display characteristics in terms of viewing angle are therefore obtained. IPS liquid crystal display devices are particularly superior in tone reproduction in the viewing angle direction.

When a lateral electric field is applied to the liquid crystal layer having a homogeneous alignment, there are two possible rotation directions, clockwise and counter-clockwise, for the alignment of the liquid crystal layer. The liquid crystal layer can be prompted to rotate the alignment in one of the two possible directions by setting the direction of the electrode stripes (i.e., electric field direction) and the initial alignment direction of the liquid crystal layer suitably. In other words, when the alignment direction of the liquid crystal layer rotates with the initial alignment direction as a starting point, a rotation direction that requires a smaller rotation angle to be parallel to the electric field direction is chosen. A uniform alignment state is therefore obtained, at least at the center of each pixel, even when a voltage is applied.

Among IPS liquid crystal display devices, IPS provectus (IPS-Pro) liquid crystal display devices have excellent transmittance and are therefore capable of brighter display. IPS-Pro liquid crystal display devices accomplish high transmittance by disposing a pixel electrode and a common electrode in different layers, and shaping one of the two electrodes that is disposed close to a liquid crystal layer in a stripe pattern in plan view, while giving the electrode that is disposed far from the liquid crystal layer a solid flat shape in plan view. Conventional IPS-Pro liquid crystal display devices usually choose the pixel electrode as the electrode that is disposed close to the liquid crystal layer. However, in many of IPS-Pro liquid crystal display devices that have been proposed in recent years, the common electrode is chosen as the electrode that is disposed close to the liquid crystal layer, the stripe structure stretches over a plurality of pixels, and the direction of the stripes is set in the direction of the shorter sides of the pixels (see JP 2007-256905 A, for example).

SUMMARY OF THE INVENTION

In the case where an IPS-Pro liquid crystal display device is structured to dispose a stripe-patterned electrode in each pixel in a manner that makes the electrode in one pixel independent of the electrode in another pixel, the stripe structure is closed at both ends of each pixel. The electric field direction in the closed stripe structure has an angular distribution of 180°, thus creating at one of the ends of the pixel a portion where liquid crystal molecules rotate upon voltage application in a direction reverse to the rotation direction of liquid crystal molecules that are at the center of the pixel. At the border between the portion where liquid crystal molecules rotate in the backward direction and the portion where liquid crystal molecules rotate in the forward direction, two alignment changes that have opposing rotation directions are balanced, with the result that no change in alignment occurs in the liquid crystal layer. IPS-Pro liquid crystal display devices usually display a black screen by applying no voltage, and hence a portion of the liquid crystal layer where the alignment does not change is displayed as a black line and lowers the transmittance. A black line appearing at a pixel end as this is hereinafter referred to as pixel end domain. A concrete example of the pixel end domain is given later.

In IPS-Pro liquid crystal display devices that are used in portable electronic devices, the reduction in the areal dimensions of each pixel is making it difficult to ignore the influence of the lowering of transmittance due to the pixel end domain. The lowering of transmittance due to the pixel end domain is particularly noticeable when, for example, the stripe direction within a single pixel is set in the direction of the shorter sides of the pixel in 3.1-inch WVGA panels, which are mainstream liquid crystal displays in today's cell phones.

The IPS-Pro liquid crystal display devices can choose the common electrode as the electrode that is disposed close to the liquid crystal layer as described above. The problem of the stripe structure that is closed at the pixel ends is therefore seemingly solved by, for example, giving the common electrode a stripe structure that stretches over a plurality of pixels. The stripe structure that stretches over a plurality of pixels is hereinafter referred to as inter-pixel stripe structure.

The pixel electrode, on the other hand, retains ends at the borders between pixels because the pixel electrode in one pixel needs to be independent of the pixel electrode in another pixel. The presence of the pixel electrode ends generates an electric field at an end of each pixel in a direction different from the electric field direction at the center of the pixel, thereby causing a backward rotation of the alignment of the liquid crystal layer. The pixel end domain is thus generated in the inter-pixel stripe structure as well.

An object of the present invention is to provide a technology capable of solving the lowering of transmittance due to the pixel end domain in IPS-Pro liquid crystal display devices.

The aforementioned and other objects of the present invention as well as novel features of the present invention are clarified by a description given herein and by accompanying drawings.

A representative aspect of the present invention disclosed herein is outlined as follows.

According to the present invention, there is provided a liquid crystal display device including a liquid crystal display panel, the liquid crystal display panel including: a liquid crystal layer having a homogeneous alignment when no electric field is applied; and a pair of substrates sandwiching the liquid crystal layer, one of the pair of substrates including a plurality of pixel electrodes, which are arranged in a matrix pattern, and a common electrode, which is disposed between the plurality of pixel electrodes and the liquid crystal layer, the common electrode having a stripe structure with a plurality of slits formed in each area where the common electrode and the plurality of pixel electrodes overlap in plan view, in which: at least some of the plurality of slits stretch over at least two adjacent pixel electrodes; the slits that stretch over at least two adjacent pixel electrodes have a first stretching direction at a center of one of the at least two adjacent pixel electrodes, and a second stretching direction in a gap between adjoining two of the at least two adjacent pixel electrodes, and the first stretching direction and the second stretching direction differ from each other; in the slits that stretch over at least two adjacent pixel electrodes, a portion where the first stretching direction is switched to the second stretching direction is located on one of the at least two adjacent pixel electrodes; and, with respect to a direction of an alignment of the liquid crystal layer when no electric field is applied, a first azimuth on an acute angle side toward the first stretching direction and a second azimuth on an acute angle side toward the second stretching direction have the same rotation direction, and the second azimuth is larger than the first azimuth.

The present invention solves the lowering of transmittance due to the pixel end domain in IPS-Pro liquid crystal display devices.

DETAILED DESCRIPTION OF THE INVENTION

The present invention is described below in detail through embodiments (examples) with reference to the drawings.

Throughout the drawings illustrating the examples, components that have the same functions are denoted by the same reference symbols to avoid repetitive descriptions.

Figure 1:
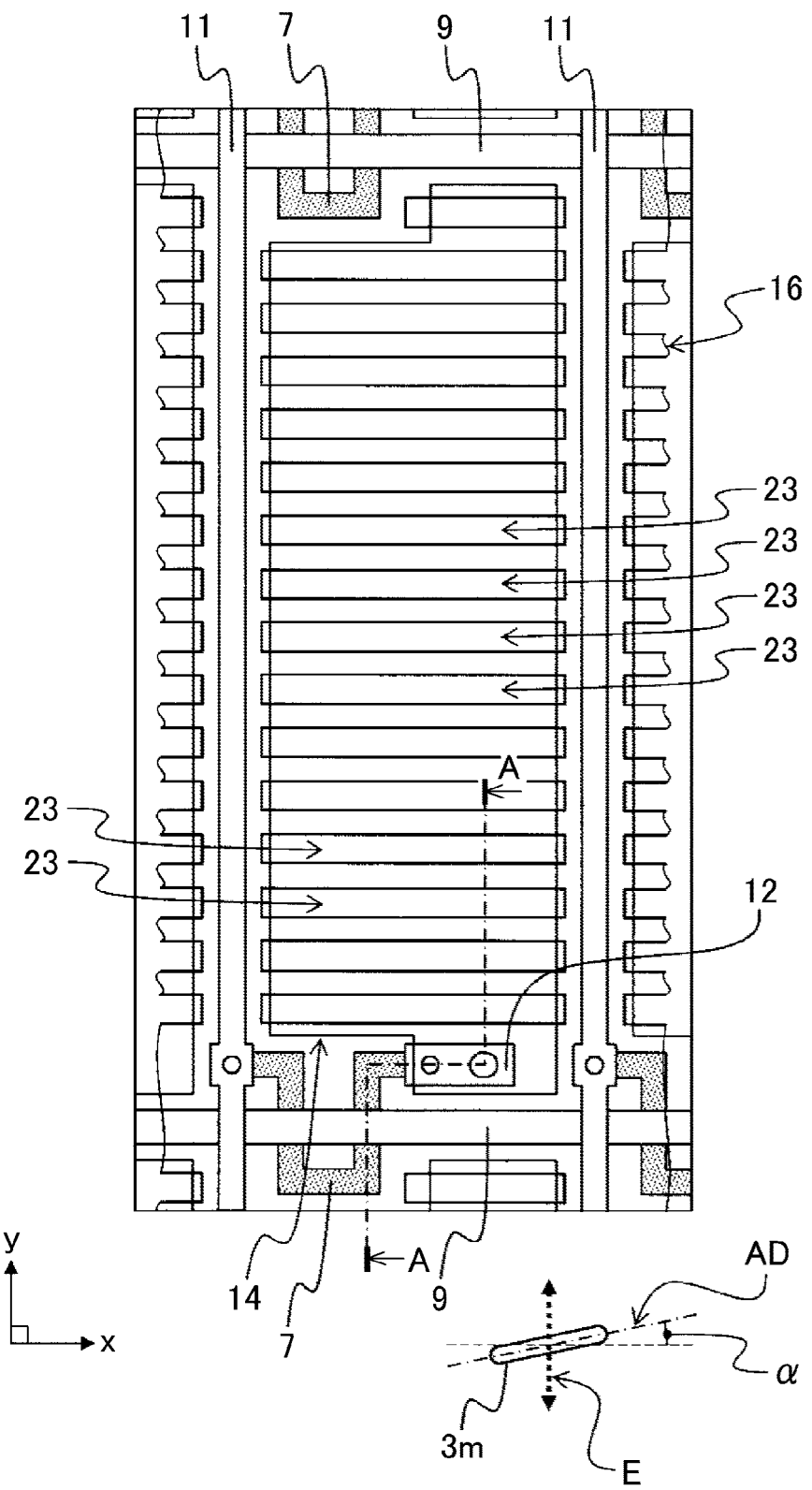
FIG. 1 is a schematic plan view illustrating an example of a planar structure of a pixel in a conventional IPS-Pro liquid crystal display panel.
Figure 2:
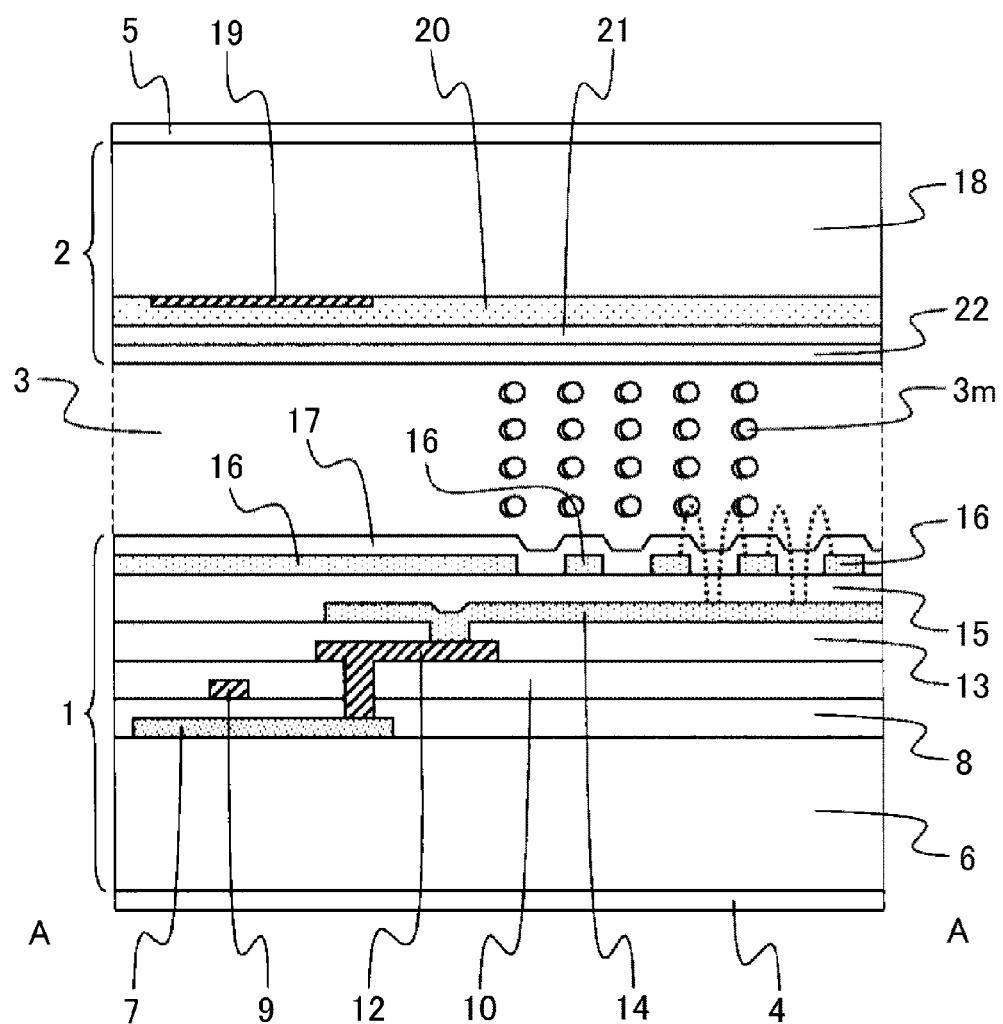
FIG. 2 is a schematic sectional view illustrating an example of a sectional structure taken along the line A-A of FIG. 1.
Figure 3:
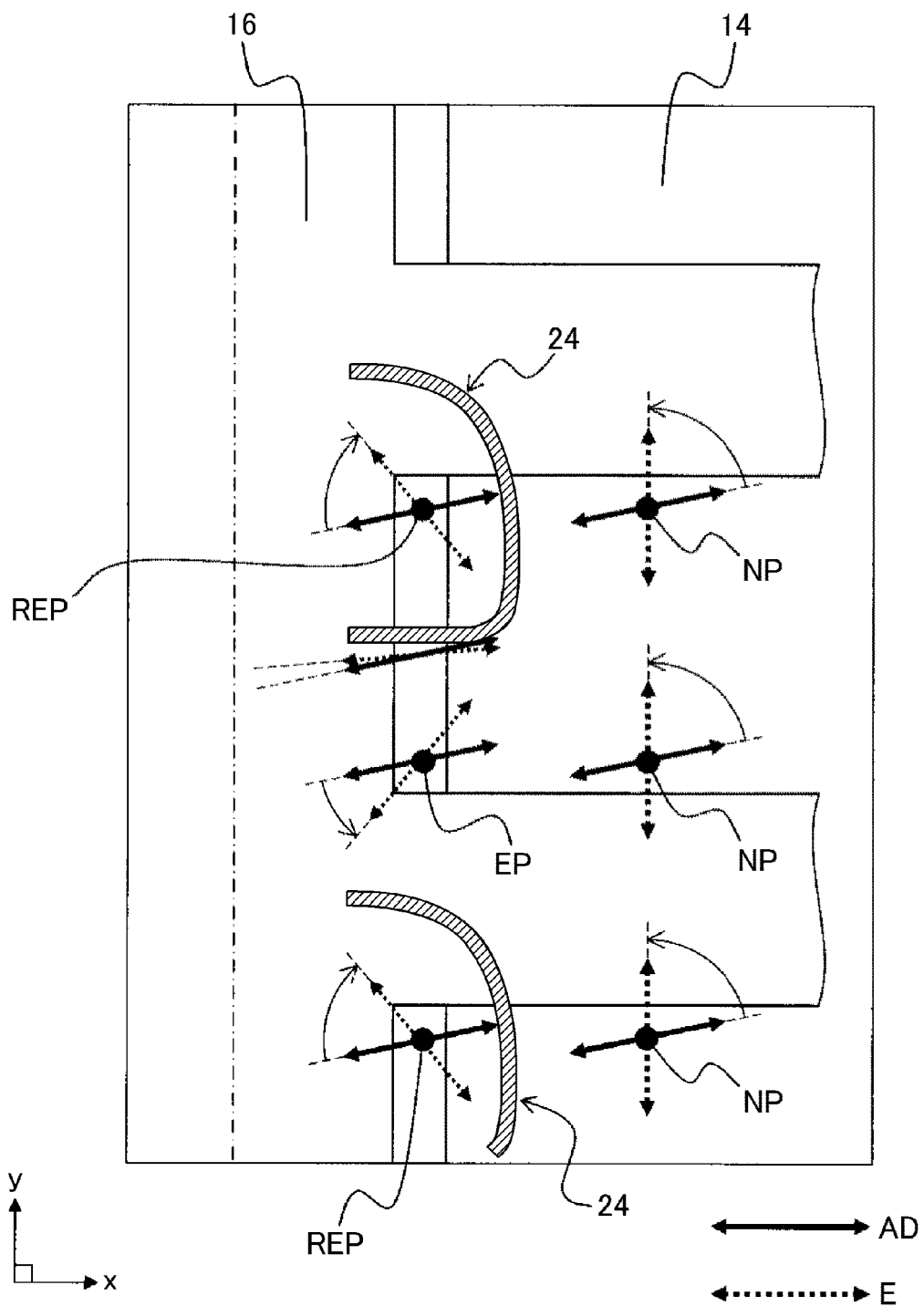
FIG. 3 is a schematic plan view illustrating how an alignment of a liquid crystal layer changes at an end of the pixel.

FIGS. 1 to 3 are schematic diagrams used for illustrating a pixel end domain according to the present invention.

FIG. 1 is a schematic plan view illustrating an example of a planar structure of a pixel in a conventional IPS-Pro liquid crystal display panel. FIG. 2 is a schematic sectional view illustrating an example of a sectional structure taken along the line A-A of FIG. 1. FIG. 3 is a schematic plan view illustrating how an alignment of a liquid crystal layer changes at an end of the pixel.

An IPS-Pro liquid crystal display device according to the present invention includes a liquid crystal display panel that chooses, out of a pixel electrode and a common electrode, the common electrode as an electrode that is disposed close to a liquid crystal layer. For example, as illustrated in FIGS. 1 and 2, the liquid crystal display panel includes a first substrate 1 and a second substrate 2 which form a pair, and a liquid crystal layer 3 is sandwiched between the pair of substrates. The liquid crystal display panel further includes, for example, a first polarizing plate 4 and a second polarizing plate 5, which are disposed to sandwich the first substrate 1, the liquid crystal layer 3, and the second substrate 2.

The first substrate 1 is a substrate that is called a TFT substrate or the like. The first substrate 1 is provided with, among others, a first insulating substrate 6 and components that are disposed between the first insulating substrate 6 and the liquid crystal layer 3. Those components include a semiconductor layer 7, a first insulating layer 8, scanning signal lines 9, a second insulating layer 10, video signal lines 11, a source-drain electrode 12, a third insulating layer 13, a pixel electrode 14, a fourth insulating layer 15, a common electrode 16, and a first alignment film 17.

The second substrate 2 is a substrate that is called a counter substrate, a color filter (CF) substrate, or the like. The second substrate 2 is provided with, among others, a second insulating substrate 18 and components that are disposed between the second insulating substrate 18 and the liquid crystal layer 3. Those components include a black matrix 19, a color filter 20, a leveling film 21, and a second alignment film 22.

The first substrate 1 and the second substrate 2 in the IPS-Pro liquid crystal display panel according to the present invention have known structures, which are disclosed in JP 2007-256905 A, for example. Detailed descriptions on portions of the structures of the first substrate 1 and the second substrate 2 that are not directly relevant to the present invention are therefore omitted herein.

Of the pixel electrode 14 and the common electrode 16, the IPS-Pro liquid crystal display panel according to the present invention disposes the common electrode 16 close to the liquid crystal layer 3 as described above. The pixel electrode 14 in one pixel is independent of the pixel electrode 14 in another pixel, and each pixel electrode 14 has a solid flat shape. The pixel electrodes 14 are arranged in a matrix pattern on the first insulating substrate 6 (the third insulating layer 10). The common electrode 16 is shared by a plurality of pixels and is disposed above the pixel electrodes 14, with the fourth insulating layer 15 interposed therebetween. The common electrode 16 has a stripe structure with a plurality of slits 23 formed in each area where the common electrode 16 and the pixel electrodes 14 overlap in plan view.

The single pixel in the plan view of FIG. 1 is a rectangular area enclosed by two scanning signal lines 9 and two video signal lines 11. The common electrode 16 in this example is disposed in a manner that disposes the plurality of slits 23 side by side in the direction of the longer sides of the pixel (y-axis direction), and the slits 23 are shaped (distributed) to respectively stretch in the direction of the shorter sides of the pixel (x-axis direction). The slits 23 of the common electrode 16 are provided in a manner that makes the slits 23 in one pixel independent of the slits 23 in another pixel.

The liquid crystal layer 3 in the IPS-Pro liquid crystal display panel has a homogeneous alignment and the long axis direction of each liquid crystal molecule $3m$ (molecular axis direction) when no electric field is applied is substantially parallel to the substrate plane (xy plane of FIG. 1). When the plurality of slits are next to one another in the longer side direction of the pixel as illustrated in FIG. 1, an application of voltage between the pixel electrode and the common electrode applies a lateral electric field that is directed to be orthogonal to the stretching direction of the slits (x direction) to the liquid crystal layer. During the application of the lateral electric field, an alignment direction AD of the liquid crystal layer 3 when no electric field is applied (hereinafter, referred to as initial alignment direction) is controlled to be rotated by an angle α (about 5 degrees to 15 degrees) from a direction orthogonal to the direction of the lateral electric field, which is denoted by E.

When a voltage is applied between the pixel electrode 14 and the common electrode 16 in this liquid crystal display panel, the relation between the direction of the lateral electric field E and the rotation direction of the liquid crystal molecules $3m$ is, for example, as illustrated in FIG. 3 at an end of each slit 23. In FIG. 3, the double-pointed arrows in solid line point the initial alignment direction AD of the liquid crystal layer 3, whereas the double-pointed arrows in dotted line point the direction of the lateral electric field E. FIG. 3 also uses the single-pointed arrows in solid line (excluding the leader lines that connect components and reference symbols) to point the rotation direction of the liquid crystal molecules $3m$.

As can be seen in FIG. 3, the direction of the lateral electric field E is not parallel to the y direction at an end of each slit 23 and, consequently, an end of each slit 23 includes a portion where an electric field is generated to rotate the liquid crystal molecules $3m$ in the same direction as the liquid crystal molecule rotation direction at the center (point NP) of the pixel (hereinafter, referred to as forward direction) (this portion corresponds to a point EP and its surrounding area), and a portion where the lateral electric field E is generated to rotate the liquid crystal molecules $3m$ in a direction reverse to the forward direction (hereinafter, referred to as backward direction) (this portion corresponds to a point REP and its surrounding area).

At the border between the portion where the liquid crystal molecules $3m$ rotate in the backward direction and the portion where the liquid crystal molecules $3m$ rotate in the forward direction, two alignment changes that have opposing directions are balanced, with the result that no change in alignment occurs in the liquid crystal layer 3. In the case where black screen display is accomplished by applying no voltage to the liquid crystal layer 3, a portion 24 where no alignment change occurs in the liquid crystal layer (portion that is always displayed in black on the screen) is therefore created in white screen display as illustrated in FIG. 3, and lowers the transmittance. The portion that appears at a pixel end as a spot always displayed in black on the screen is referred to herein as a pixel end domain.

Structural examples of the IPS-Pro liquid crystal display panels that eliminate the pixel end domain 24 are described below.

Example 1

Figure 4:
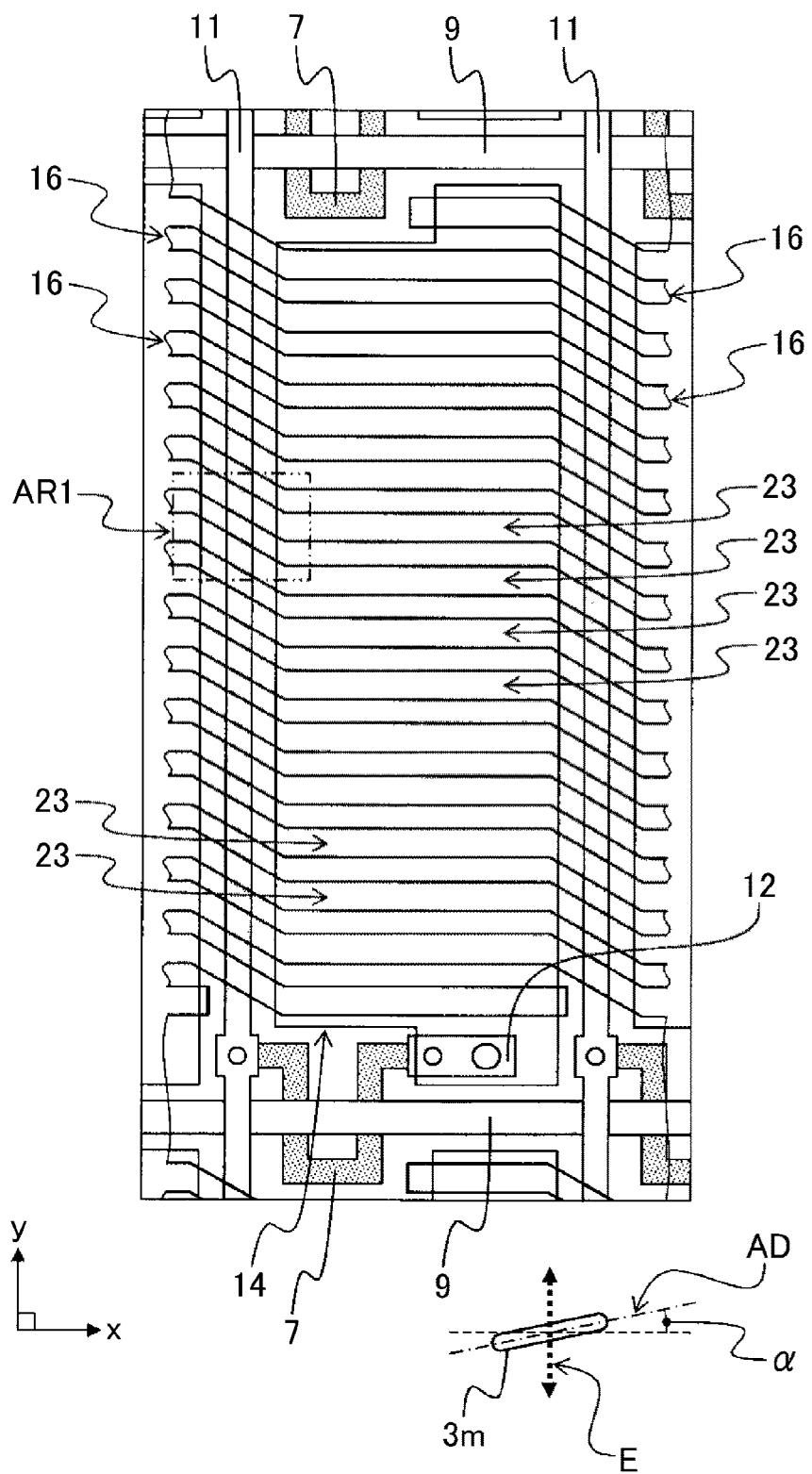
FIG. 4 is a schematic plan view illustrating an example of a planar structure of a pixel in an IPS-Pro liquid crystal display panel according to Example 1 of the present invention.
Figure 5:
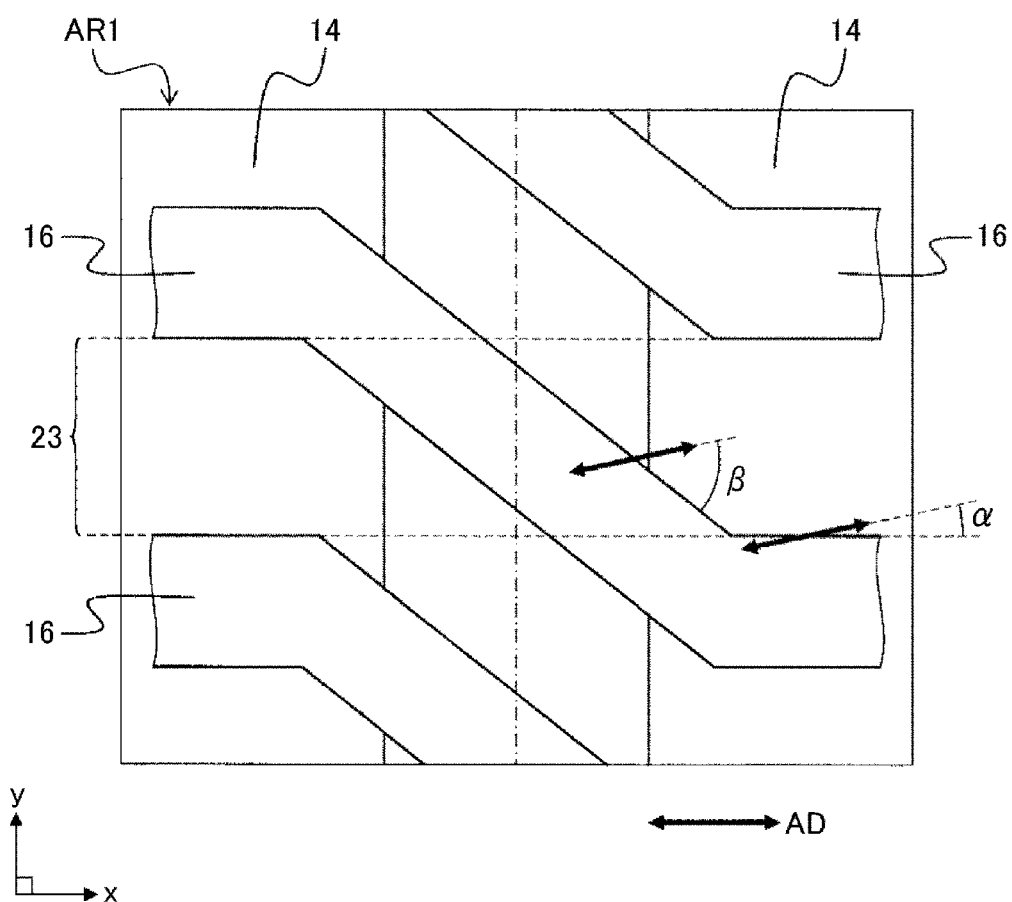
FIG. 5 is an enlarged plan view of an area AR1 illustrated in FIG. 4.

FIGS. 4 and 5 are schematic diagrams illustrating an example of a schematic structure of an IPS-Pro liquid crystal display panel according to Example 1 of the present invention.

FIG. 4 is a schematic plan view illustrating an example of a planar structure of a pixel in the IPS-Pro liquid crystal display panel according to Example 1 of the present invention. FIG. 5 is an enlarged plan view of an area AR1 illustrated in FIG. 4.

The liquid crystal display panel of Example 1 has a structure similar to that of the liquid crystal display panel illustrated in FIGS. 1 and 2, and chooses, out of the pixel electrode 14 and the common electrode 16 which are provided in the first substrate 1, the common electrode 16 as an electrode that is disposed close to the liquid crystal layer 3. The liquid crystal display panel of Example 1 differs from the liquid crystal display panel of FIGS. 1 and 2 in how the slits 23 provided in the common electrode 16 are distributed.

For example, the liquid crystal display panel of Example 1 employs the shape (distribution) of FIGS. 4 and 5 for the plurality of slits 23 provided in areas where the common electrode 16 and the pixel electrodes 14 overlap. In FIGS. 4 and 5, each slit 23 stretches over two or more pixel electrodes 14. In short, the stripe structure of the common electrode 16 provided in the liquid crystal display panel of Example 1 is defined as an inter-pixel stripe structure.

Each slit 23 stretches in a first stretching direction at the center of the relevant pixel electrode 14, and stretches in a second stretching direction in a gap between two adjacent pixel electrodes 14. The first stretching direction is the x-axis direction and the second stretching direction is a direction that is not the x-axis direction. Portions of each slit 23 where the slit 23 switches from the first stretching direction to the second stretching direction are positioned on the pixel electrodes 14.

The second stretching direction is set, for example, as illustrated in FIG. 5. In FIG. 5, when the initial alignment direction AD of the liquid crystal layer 3 is given as the reference (0 degrees), an azimuth α on the acute angle side toward the first stretching direction and an azimuth β on the acute angle side toward the second stretching direction have the same rotation direction, and the azimuth β is larger than the azimuth α.

A desirable example of the shape of the slits 23 which stretch over two or more pixels is illustrated in FIG. 5. In FIG. 5, the position of each slit 23 in the y-axis direction is lower by the height of a single slit 23 in one of the two adjacent pixels than in the other of the two adjacent pixels. In other words, the slits 23 are desirably shaped in a manner that connects each of the slits 23 on the right-hand side pixel electrode 14 to the slit 23 adjacent to one of the slits 23 on the left-hand side pixel electrode 14 that is an extension of the slit 23 on the right-hand side pixel electrode 14. This way, every two adjacent pixels have a matching stripe structure for the common electrode 16 and display areas (opening areas) of the two adjacent pixels can be arranged without being staggered from each other, which facilitates pixel arrangement.

Figure 6:
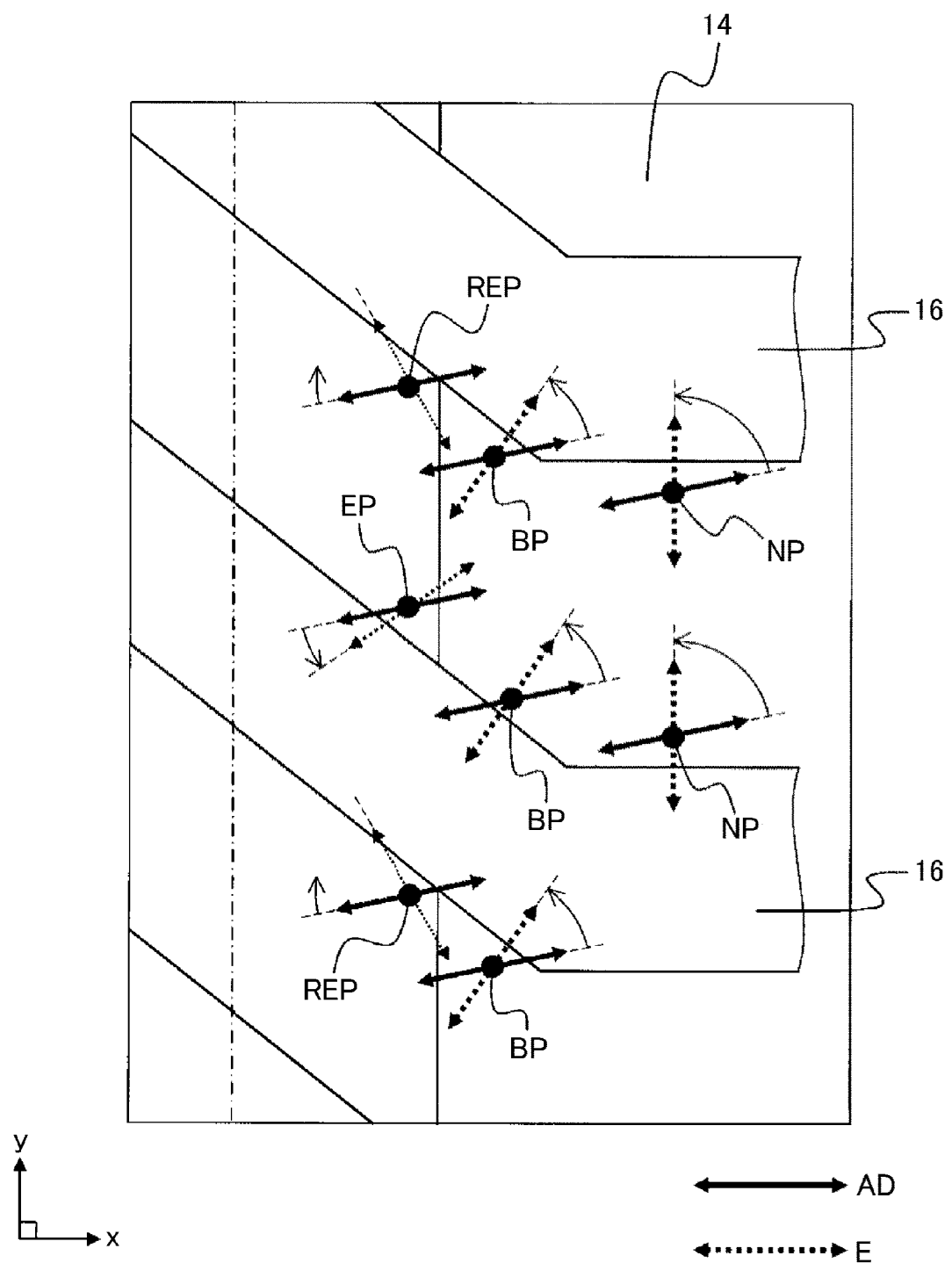
FIG. 6 is a schematic plan view illustrating how an alignment of a liquid crystal layer changes at an end of the pixel in the IPS-Pro liquid crystal display panel of Example 1.

FIG. 6 is a schematic plan view illustrating how an alignment of the liquid crystal layer changes at an end of the pixel in the IPS-Pro liquid crystal display panel of Example 1.

In FIG. 6, the double-pointed arrows in solid line point the initial alignment direction AD of the liquid crystal layer 3. FIG. 6 uses the double-pointed arrows in dotted line to point the direction of the lateral electric field E with the arrow direction, and to indicate the intensity of the lateral electric field E to be applied with the line thickness. FIG. 6 also uses the single-pointed arrows in solid line to point the rotation direction of the liquid crystal molecules 3m.

When a voltage is applied between the pixel electrode 14 and the common electrode 16 in the liquid crystal display panel of Example 1, the lateral electric field E that is directed in the y-axis direction orthogonal to the stretching direction (first stretching direction) of each slit 23 is applied to the liquid crystal layer 3 at the center of the pixel (portion containing the point NP). The rotation direction of the liquid crystal molecules 3m at the center of the pixel (forward direction) is counter-clockwise at this point.

The lateral electric field E that is generated at an end of the pixel, on the other hand, is directed in an oblique direction with respect to the direction (y-axis direction) of the lateral electric field E at the center of the pixel (lateral electric field E at a pixel end is hereinafter referred to as oblique electric field), because the stretching direction of the common electrode 16 changes in a manner that follows changes in the stretching direction of the slit 23.

At this point, the electric field direction at a point BP, which is located between the portion where the slit 23 switches from the first stretching direction to the second stretching direction and the edge of the pixel electrode 14, is substantially orthogonal to the stretching direction of the slit 23 as illustrated in FIG. 6. The liquid crystal molecules 3m at and around the point BP therefore rotate in the forward direction.

In a portion that is near the edge of the pixel electrode 14 and does not overlap with the pixel electrode 14 in plan view, the oblique electric field E that rotates the liquid crystal molecules 3m in the forward direction is generated at the point EP which is located in a portion where an angle formed by the edge of the common electrode 16 and the edge of the pixel electrode 14 is an acute angle, and the oblique electric field E that rotates the liquid crystal molecules 3m in the backward direction is generated at the point REP which is located in a portion where the angle formed by the edge of the common electrode 16 and the edge of the pixel electrode 14 is an obtuse angle. However, the oblique electric field E at and around the point REP is smaller in intensity than the oblique electric fields E at the point BP and the point EP. The backward rotation of the liquid crystal molecules 3m at and around the point REP is therefore inhibited by the forward rotation of the liquid crystal molecules 3m in the vicinity of the point BP and the point EP. In short, in the liquid crystal display panel of Example 1, the backward rotation of the liquid crystal molecules 3m at a pixel end is inhibited and the generation of the pixel end domain is consequently prevented.

An advantage of a liquid crystal display device that includes the liquid crystal display panel of Example 1 is that no residual image is observed after the liquid crystal display device is operated with a stylus through, for example, a touch panel laid on top of the liquid crystal display panel.

Figure 7:
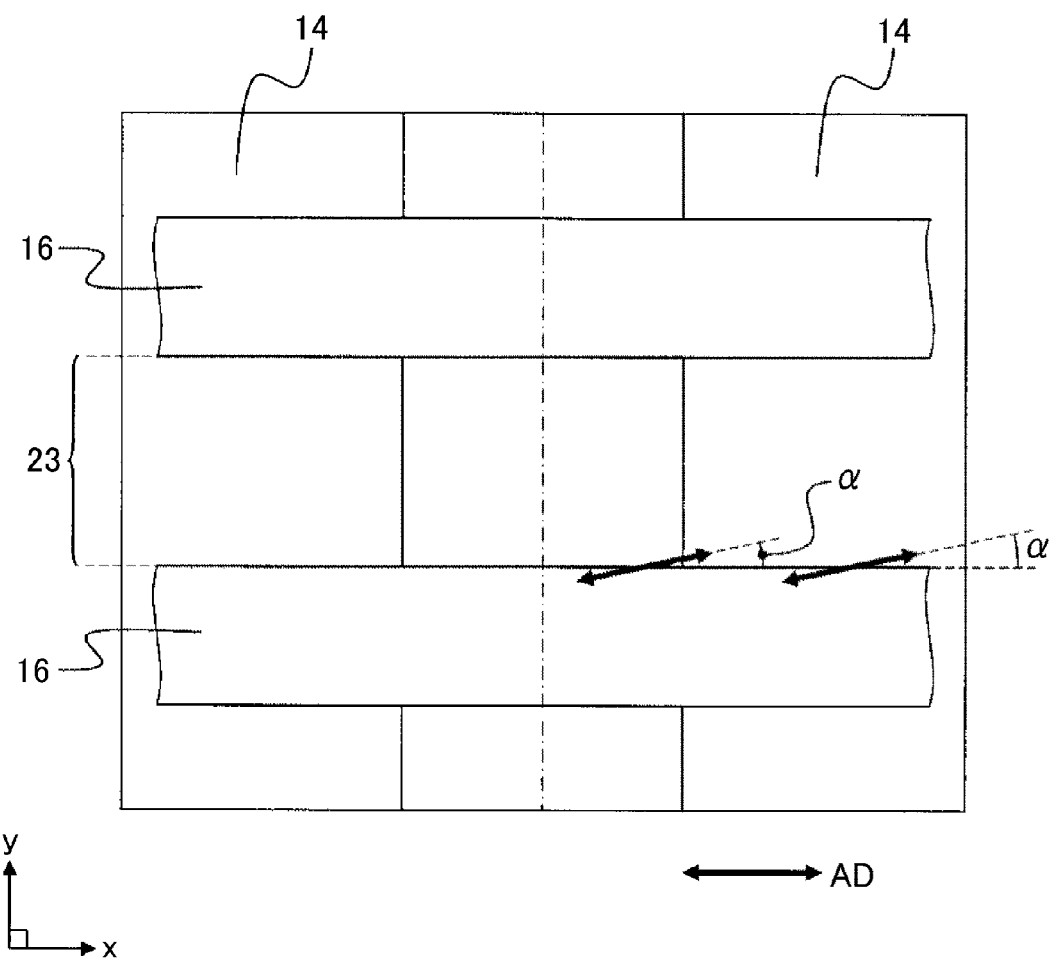
FIG. 7 is a schematic plan view illustrating a planar shape of slits of a common electrode in an IPS-Pro liquid crystal display panel according to Comparative Example 1.
Figure 8:
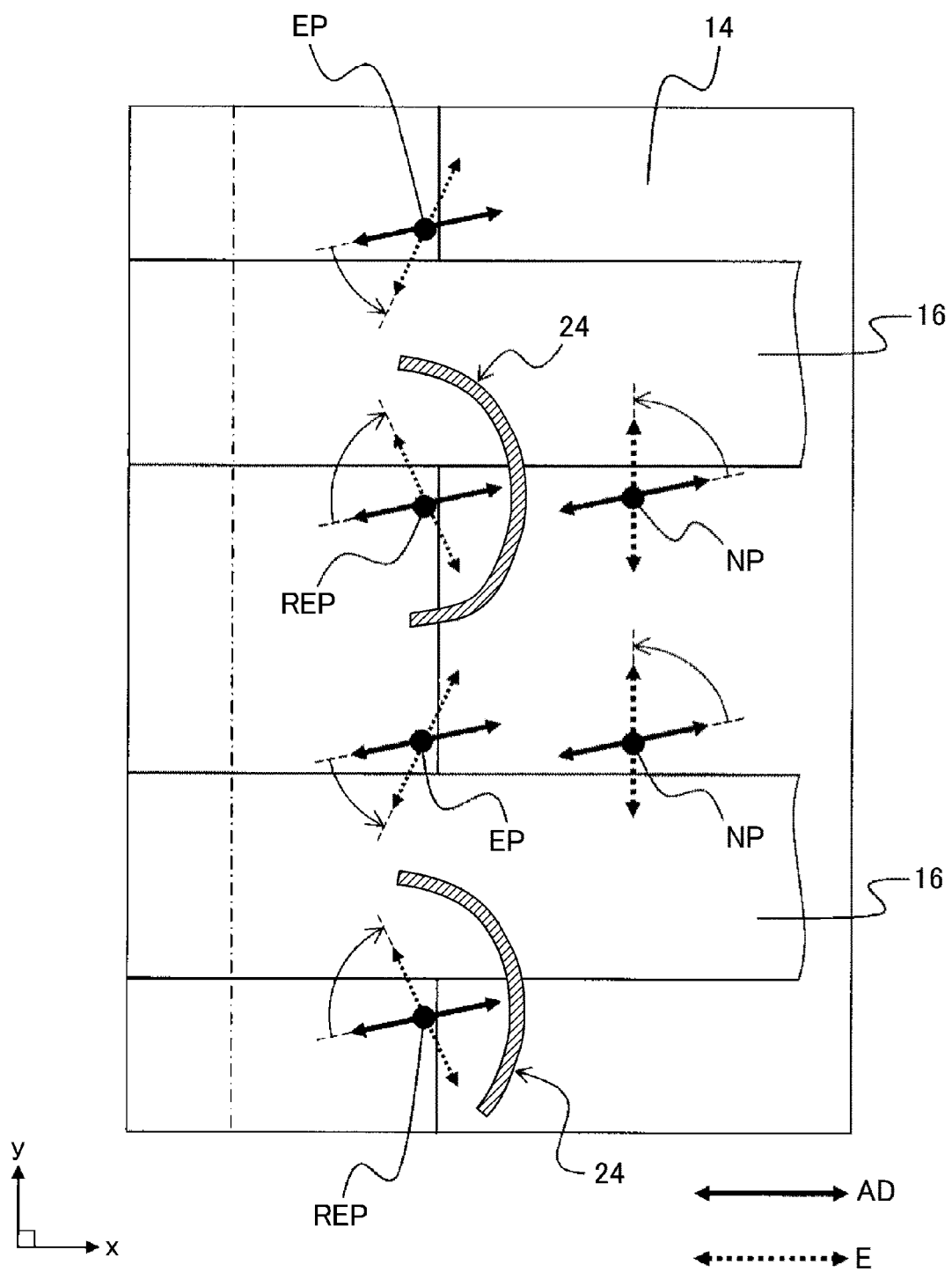
FIG. 8 is a schematic plan view illustrating how an alignment of a liquid crystal layer changes at an end of a pixel in the IPS-Pro liquid crystal display panel of Comparative Example 1.

FIGS. 7 and 8 are schematic diagrams illustrating a schematic structure of an IPS-Pro liquid crystal display panel according to Comparative Example 1 and how an alignment of a liquid crystal layer changes when an electric field is applied in Comparative Example 1.

FIG. 7 is a schematic plan view illustrating a planar shape of slits of a common electrode in the IPS-Pro liquid crystal display panel of Comparative Example 1. FIG. 8 is a schematic plan view illustrating how the alignment of the liquid crystal layer changes at an end of a pixel in the IPS-Pro liquid crystal display panel of Comparative Example 1.

In FIG. 8, the double-pointed arrows in solid line point the initial alignment direction AD of the liquid crystal layer 3. FIG. 8 uses the double-pointed arrows in dotted line to point the direction of the lateral electric field E with the arrow direction, and to indicate the intensity of the lateral electric field E to be applied with the line thickness. FIG. 8 also uses the single-pointed arrows in solid line (excluding the leader lines that connect components and reference symbols) to point the rotation direction of the liquid crystal molecules 3m.

In order to examine effects of the liquid crystal display panel of Example 1, the inventors of the present invention first fabricated a liquid crystal display panel in which the slits 23 provided in the common electrode 16 were distributed (shaped) as illustrated in, for example, FIG. 7. In FIG. 7, the slits 23 at a gap between two pixel electrodes 14 stretch in the x-axis direction, which is the same as the stretching direction of the slits 23 at the center of each pixel. This liquid crystal display panel is hereinafter referred to as liquid crystal display panel of Comparative Example 1. The liquid crystal display panel of Comparative Example 1 in a white screen display mode was measured for transmittance, and the measured transmittance was lower than that of the liquid crystal display panel of Example 1. The liquid crystal display panel of Comparative Example 1 in a white screen display mode was also observed with a microscope, and the pixel end domain 24 was found at a pixel end.

When the liquid crystal display panel of Comparative Example 1 is in a white screen display mode, the relation between the lateral electric field E that is generated at a pixel end and the initial alignment direction AD of the liquid crystal layer 3 is, for example, as illustrated in FIG. 8. Specifically, a portion that is near the edge of the pixel electrode 14 and does not overlap with the pixel electrode 14 in plan view contains a portion like the point EP where the oblique electric field E that rotates the liquid crystal molecules 3m in the forward direction is generated and a portion like the point REP where the oblique electric field E that rotates the liquid crystal molecules 3m in the backward direction is generated. In the liquid crystal display panel of Comparative Example 1, the edge of the common electrode 16 and the edge of the pixel electrode 14 around the point REP form an angle of 90 degrees, which makes the intensity of the lateral electric field E applied to the point REP substantially equal to the intensity of the lateral electric field E applied to the point EP, and greater than the electric field intensity at the point REP in the liquid crystal display panel of Example 1.

The liquid crystal display panel of Comparative Example 1 therefore cannot inhibit growth that is due to the liquid crystal molecules 3m rotating in the forward direction, and the liquid crystal molecules 3m at and around the point REP rotate in the backward direction. As a result, the pixel end domain 24 is generated at the border between the portion where the liquid crystal molecules 3m rotate in the backward direction and the portion where the liquid crystal molecules 3m rotate in the forward direction.

A residual image was observed in a liquid crystal display device that includes the liquid crystal display panel of Comparative Example 1 after the liquid crystal display device was operated with a stylus through a touch panel laid on top of the liquid crystal display panel. A pixel that generated the residual image was observed with a microscope to find out that the pixel end domain 24 extended toward the center of the pixel. The pixel end domain 24 extended presumably because the depression pressure applied fluidized the liquid crystal layer 3 and the fluidized liquid crystal layer 3 retained a reverse twist. The generation of the pixel end domain 24 thus gives rise to another problem in that a residual image occurs when a touch panel is used.

This may be prevented by inserting a depression pressure relieving layer between the liquid crystal display panel and the touch panel and thus lessening the depression pressure applied during the operation of the touch panel. However, newly adding this layer increases the thickness of the laminate constituted of the liquid crystal display panel and the touch panel. The addition also creates parallax and impairs the operability. From those points, preventing the generation of the pixel end domain 24 in the first place as in the liquid crystal display panel of Example 1 is the preferred way of avoiding a residual image when a touch panel is used.

Figure 9:
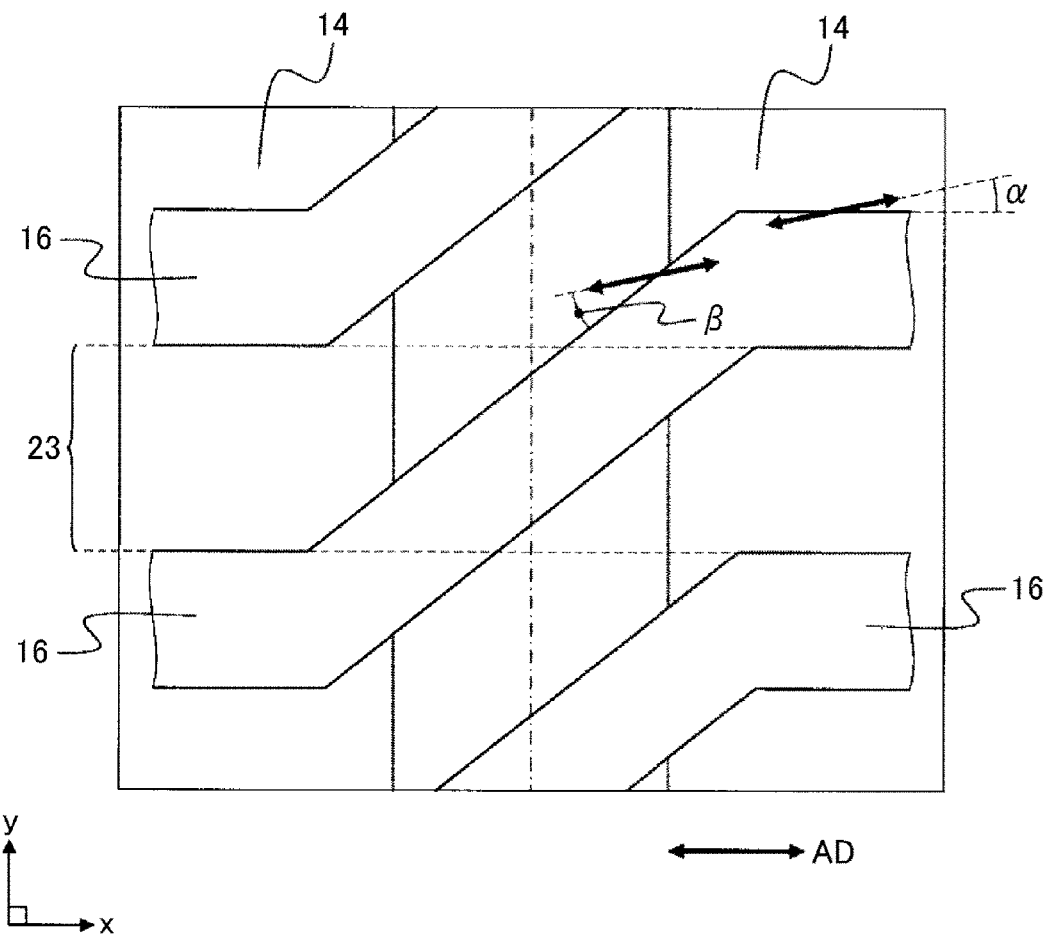
FIG. 9 is a schematic plan view illustrating a planar shape of slits of a common electrode in an IPS-Pro liquid crystal display panel according to Comparative Example 2.
Figure 10:
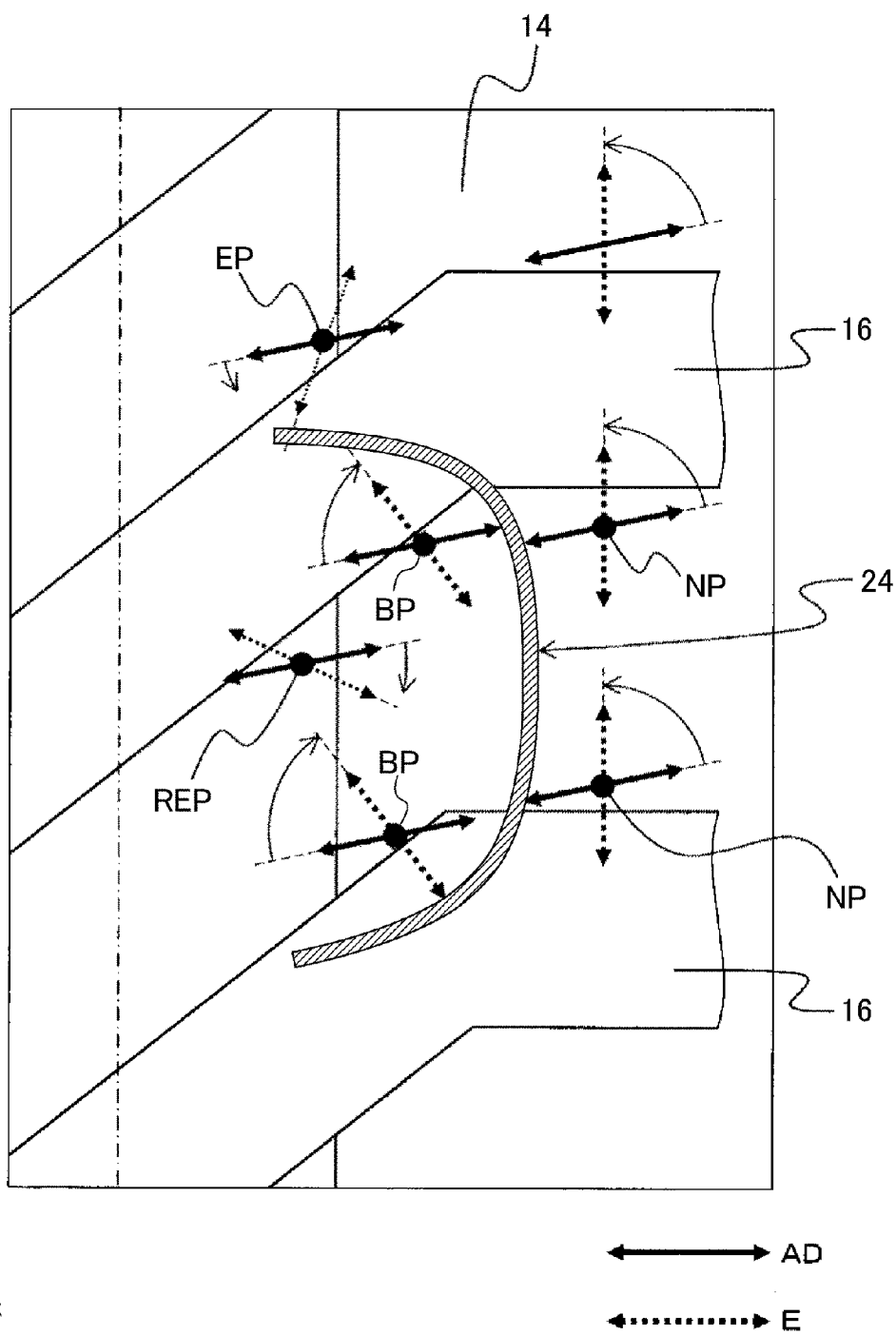
FIG. 10 is a schematic plan view illustrating how an alignment of a liquid crystal layer changes at an end of a pixel in the IPS-Pro liquid crystal display panel of Comparative Example 2.

FIGS. 9 and 10 are schematic diagrams illustrating a schematic structure of an IPS-Pro liquid crystal display panel according to Comparative Example 2 and how an alignment of a liquid crystal layer changes when an electric field is applied in Comparative Example 2.

FIG. 9 is a schematic plan view illustrating a planar shape of slits of a common electrode in the IPS-Pro liquid crystal display panel of Comparative Example 2. FIG. 10 is a schematic plan view illustrating how the alignment of the liquid crystal layer changes at an end of a pixel in the IPS-Pro liquid crystal display panel of Comparative Example 2.

In FIG. 10, the double-pointed arrows in solid line point the initial alignment direction AD of the liquid crystal layer 3. FIG. 10 uses the double-pointed arrows in dotted line to point the direction of the lateral electric field E with the arrow direction, and to indicate the intensity of the lateral electric field E to be applied with the line thickness. FIG. 10 also uses the single-pointed arrows in solid line (excluding the leader lines that connect components and reference symbols) to point the rotation direction of the liquid crystal molecules 3m.

In order to examine effects of the liquid crystal display panel of Example 1, the inventors of the present invention next fabricated a liquid crystal display panel in which the slits 23 provided in the common electrode 16 were distributed (shaped) as illustrated in, for example, FIG. 9. In FIG. 9, the slits 23 at a gap between two pixel electrodes 14 stretch in a second stretching direction, which is reverse to the second stretching direction of the liquid crystal display panel of Example 1. This liquid crystal display panel is hereinafter referred to as liquid crystal display panel of Comparative Example 2. Specifically, in the liquid crystal display panel of Comparative Example 2, when the initial alignment direction AD of the liquid crystal layer 3 is given as the reference (0 degrees), the azimuth α on the acute angle side toward the first stretching direction and the azimuth β on the acute angle side toward the second stretching direction have opposing rotation directions. The liquid crystal display panel of Comparative Example 2 in a white screen display mode was measured for transmittance, and the measured transmittance was lower than that of the liquid crystal display panel of Example 1. The liquid crystal display panel of Comparative Example 2 in a white screen display mode was also observed with a microscope, and the pixel end domain 24 was found at a pixel end.

When the liquid crystal display panel of Comparative Example 2 is in a white screen display mode, the relation between the lateral electric field E that is generated at a pixel end and the initial alignment direction AD of the liquid crystal layer 3 is, for example, as illustrated in FIG. 10. In this case, the direction of the lateral electric field E at the point BP, which is located between the portion where the slit 23 switches from the first stretching direction to the second stretching direction and the edge of the pixel electrode 14, is substantially orthogonal to the second stretching direction of the slit 23. The liquid crystal molecules 3m at and around the point BP therefore rotate in the backward direction. Consequently, the pixel end domain 24 is generated in the liquid crystal display panel of Comparative Example 2 in the portion where the slit 23 switches from the first stretching direction to the second stretching direction.

As described above, the liquid crystal display panel of Example 1 is capable of preventing the generation of the pixel end domain 24. The lowering of transmittance due to the pixel end domain 24 is accordingly prevented.

Figure 11:
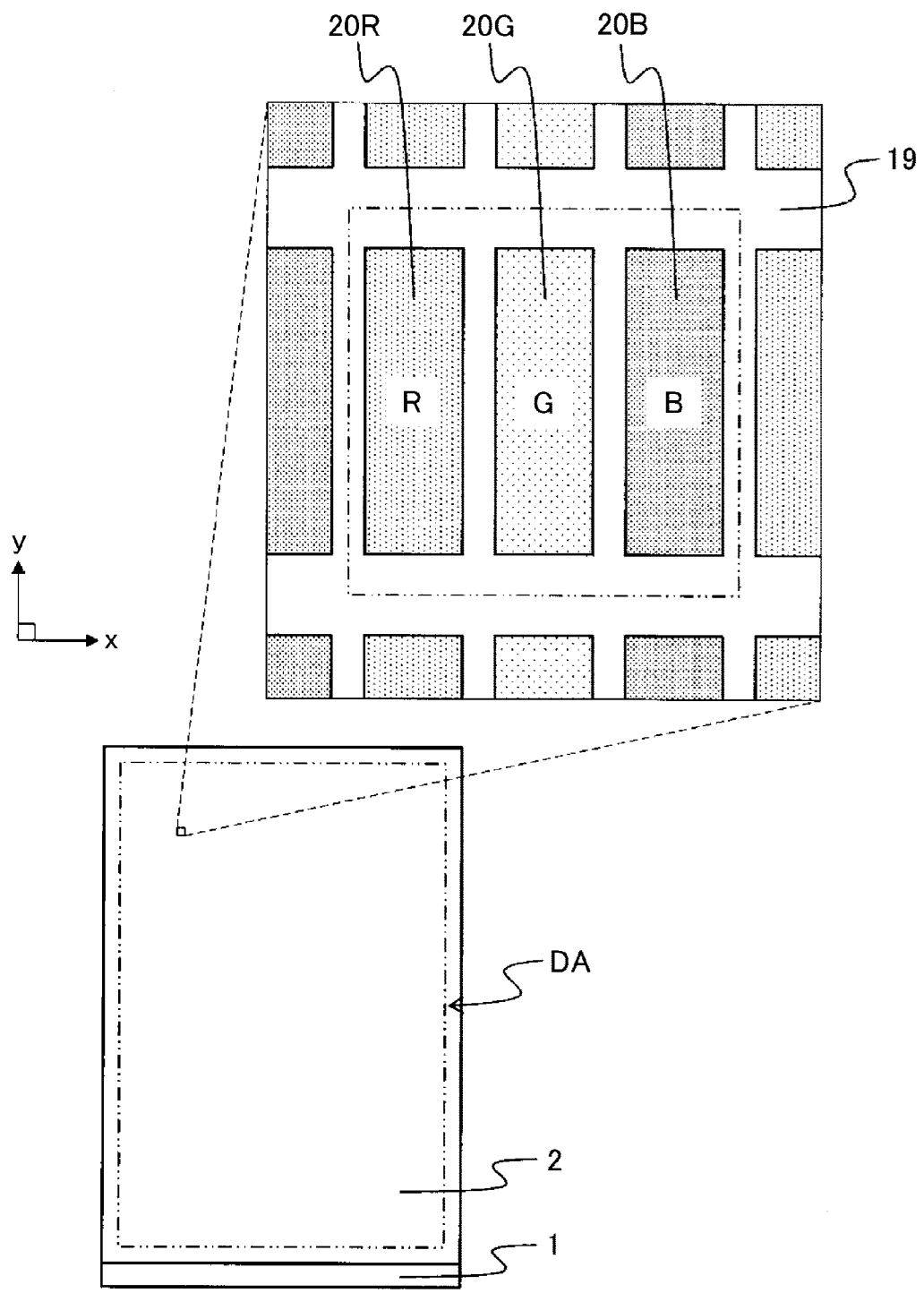
FIG. 11 is a schematic diagram illustrating example of the planar structure of the pixel in the IPS-Pro liquid crystal display panel of Example 1.
Figure 12:
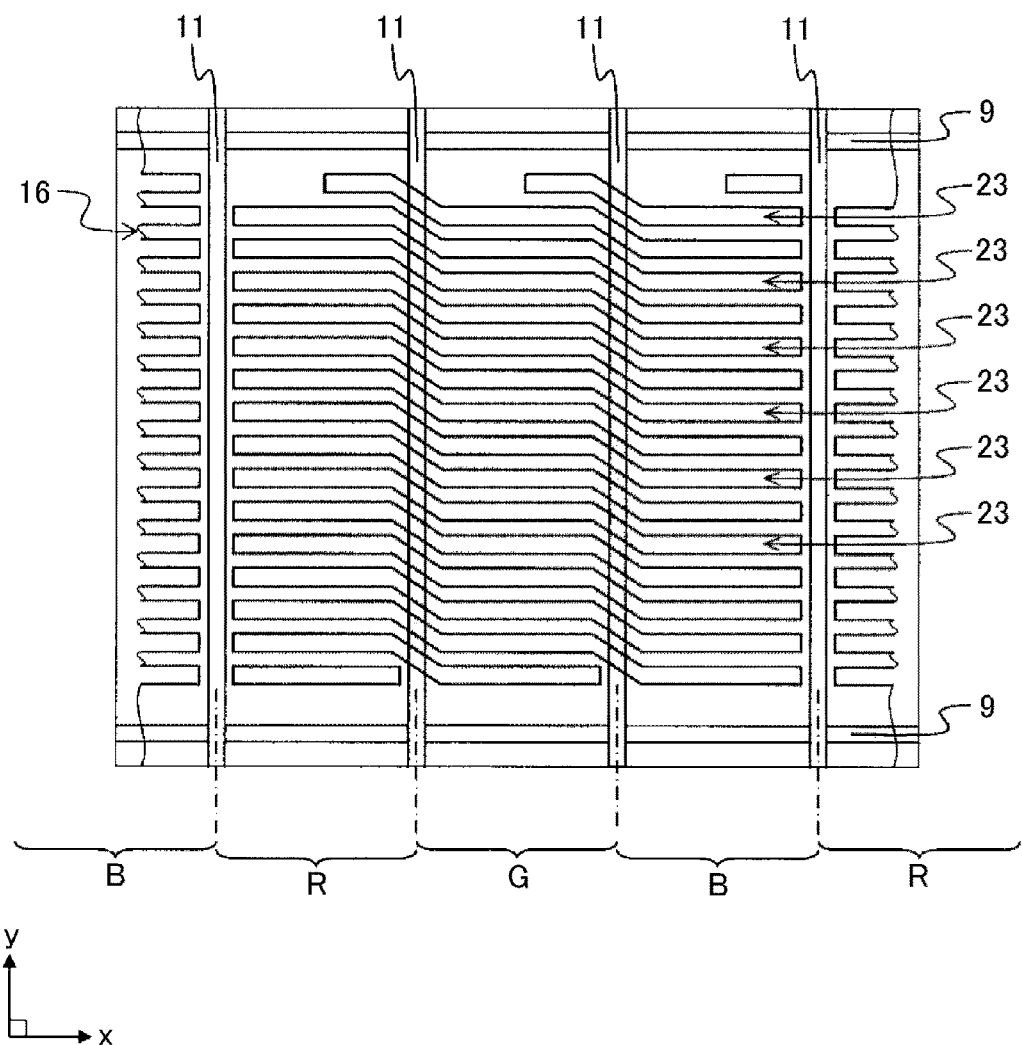
FIG. 12 is a schematic diagram illustrating an example of a desirable shape for slits that are provided in a common electrode in Example 1.

FIGS. 11 and 12 are schematic diagrams illustrating a desirable slit shape in the IPS-Pro liquid crystal display panel of Example 1.

FIG. 11 is a schematic diagram illustrating example of the planar structure of the pixel in the IPS-Pro liquid crystal display panel of Example 1. FIG. 12 is a schematic diagram illustrating an example of a desirable shape of the slits provided in the common electrode in Example 1.

When the common electrode 16 in the liquid crystal display panel of Example 1 is provided with the slits 23 in a manner that shifts the position of each slit 23 at the border between two adjacent pixels by the height of a single slit as illustrated in FIGS. 4 and 5, a single slit 23 can stretch over as many pixels as the number of the slits 23 that are provided in a single pixel. However, if the number of pixels over which a single slit 23 stretches is set too large, for example, fluctuations in the electric potential of the common electrode 16 at the center of the display area occur, which results in an uneven image quality. It is therefore preferred that the number of pixels over which a single slit 23 stretches be set not too large.

In the case where the liquid crystal display panel of Example 1 is designed to be capable of RGB color display, the color of one dot (picture element) of a video or an image is reproduced by, for example, three pixels which are an R pixel having a red filter 20R, a G pixel having a green filter 20G, and a B pixel having a blue filter 20B as illustrated in FIG. 11. The R pixel, the G pixel, and the B pixel are pixels that control the luminance of red-base color light, the luminance of green-base color light, and the luminance of blue-base color light, respectively, and are commonly called sub-pixels. This set of three pixels is provided in a large number in a display area DA of the liquid crystal display panel.

A desirable way to provide the slits 23 in this case is therefore, for example, to use the set of an R pixel, a G pixel, and a B pixel as a unit of the provision as illustrated in FIG. 12. Specifically, a link portion is desirably provided between an R pixel and a B pixel which are adjacent to each other, to thereby link stripe-patterned pieces into which the common electrode 16 is divided by the slits 23, and to terminate the slits 23 on a picture element basis. With the link portion (ends of the slits 23) provided between the R pixel and the B pixel in this manner, the pixel end domain 24 is generated only at the border between those pixels, and no pixel end domain 24 is generated in the G pixel. The transparent wavelength of the G pixel contains a wavelength range in which the spectral luminous efficacy is maximum, and preventing the generation of the pixel end domain 24 in the G pixel therefore improves the luminance transmittance even more.

In this example, slits 23 that are distributed within a single pixel instead of stretching over a plurality of pixels are formed in the R pixel and the B pixel. However, the number of those slits 23 is sufficiently smaller than in the structural example of FIG. 1, and the pixel end domain 24 lowers the transmittance to an accordingly smaller degree.

Example 2

Figure 13:
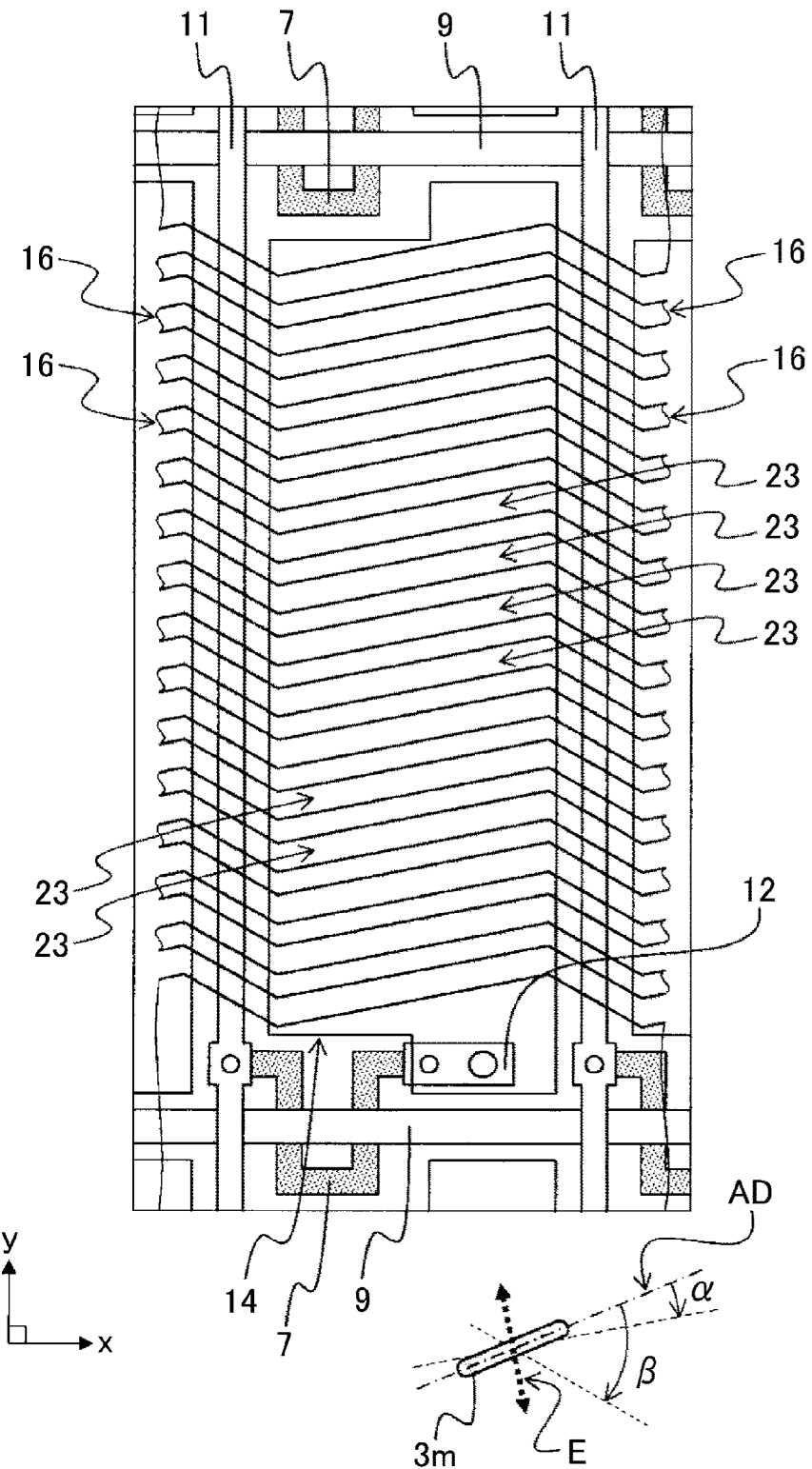
FIG. 13 is a schematic plan view illustrating an example of a planar structure of a pixel in an IPS-Pro liquid crystal display panel according to Example 2 of the present invention.

FIG. 13 is a schematic plan view illustrating an example of a planar structure of a pixel in an IPS-Pro liquid crystal display panel according to Example 2 of the present invention.

In the liquid crystal display panel of Example 2, for example, as illustrated in FIG. 13, the first stretching direction of the slits 23 provided in the common electrode 16 is slanted at an angle that is not the angle of the shorter side direction of the pixel (x-axis direction).

In this case, too, the same effects as those of the liquid crystal display panel of Example 1 are obtained by giving the same rotation direction to the azimuth α on the acute angle side toward the first stretching direction of the slits 23 and the azimuth β on the acute angle side toward the second stretching direction of the slits 23 when the initial alignment direction AD of the liquid crystal layer 3 is given as the reference (0 degrees), and by setting the azimuth β larger than the azimuth α.

Example 3

Figure 14:
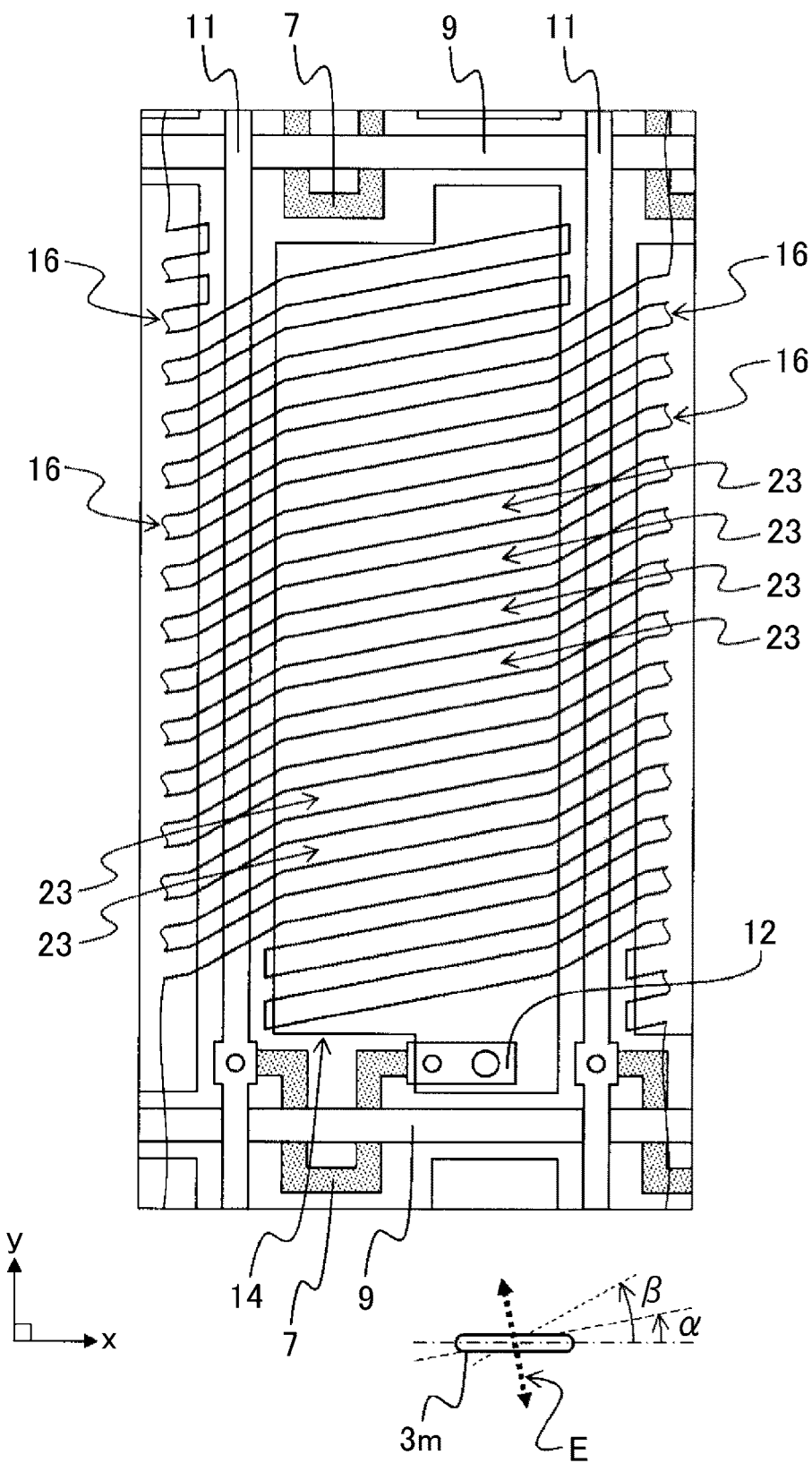
FIG. 14 is a schematic plan view illustrating an example of a planar structure of a pixel in an IPS-Pro liquid crystal display panel according to Example 3 of the present invention.

FIG. 14 is a schematic plan view illustrating an example of a planar structure of a pixel in an IPS-Pro liquid crystal display panel according to Example 3 of the present invention.

In the liquid crystal display panel of Example 2, the slits 23 are provided in a manner that makes an angle between the initial alignment direction AD of the liquid crystal layer 3 and the shorter side direction of the pixel (x-axis direction) larger than in the liquid crystal display panel of Example 1.

This is not the only way to slant the first stretching direction of the slits 23 at an angle that is not the angle of the shorter side direction of the pixel (x-axis direction). For example, the initial alignment direction AD of the liquid crystal layer 3 may be set parallel to the shorter side direction of the pixel (x-axis direction) as illustrated in FIG. 14.

In this case, by setting a refraction direction that is in the second stretching direction of the slits 23 in a direction reverse to that of Example 2, the azimuth α on the acute angle side toward the first stretching direction and the azimuth β on the acute angle side toward the second stretching direction have the same rotation direction when the initial alignment direction AD of the liquid crystal layer 3 is given as the reference (0 degrees), and the azimuth β is made larger than the azimuth α. The liquid crystal display panel of Example 3, too, is thus capable of preventing the generation of the pixel end domain 24.

Figure 15:
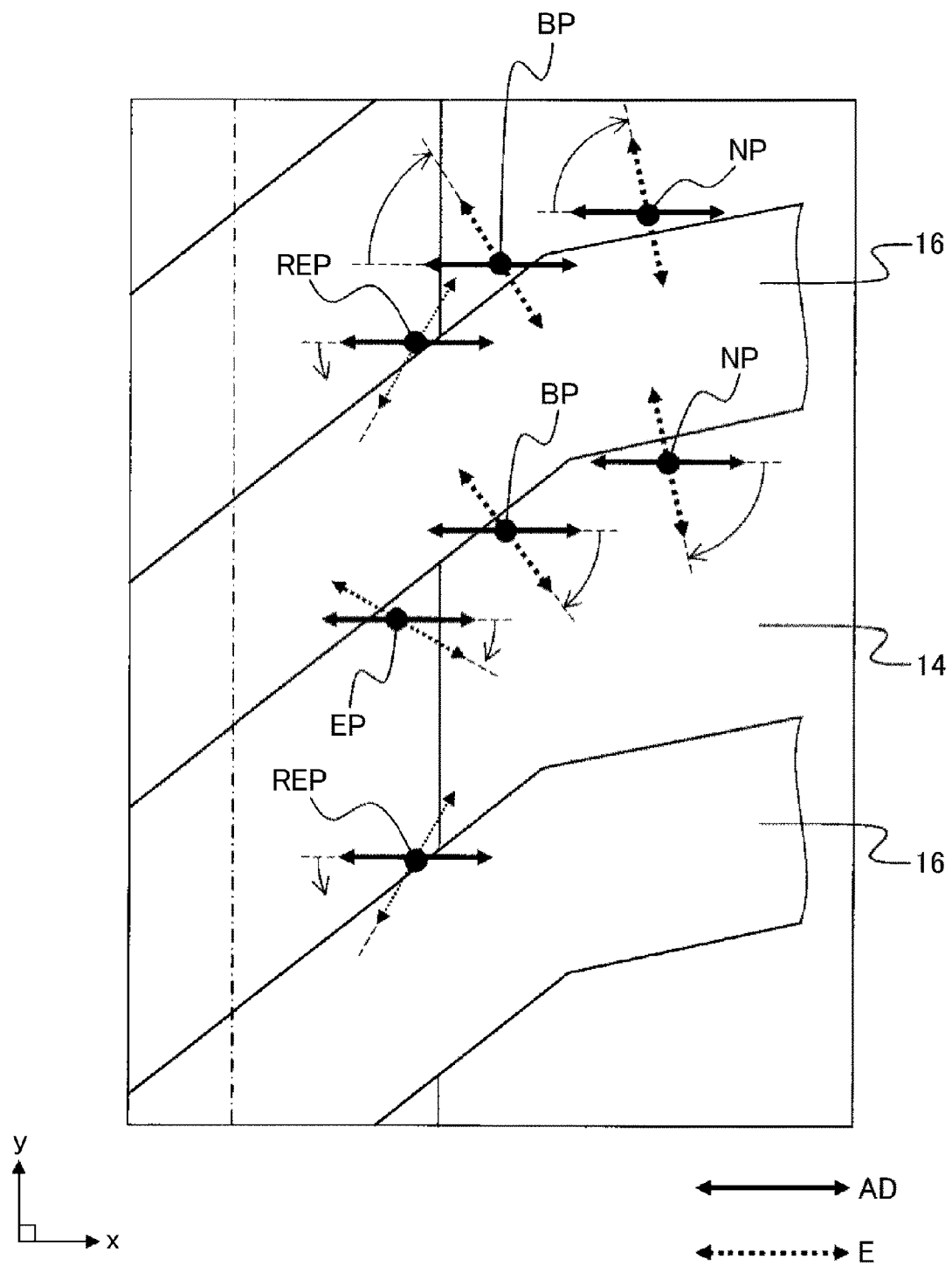
FIG. 15 is a schematic plan view illustrating how an alignment of a liquid crystal layer changes at an end of the pixel in the IPS-Pro liquid crystal display panel of Example 3.

FIG. 15 is a schematic plan view illustrating how an alignment of the liquid crystal layer changes at an end of the pixel in the IPS-Pro liquid crystal display panel of Example 3.

In FIG. 15, the double-pointed arrows in solid line point the initial alignment direction AD of the liquid crystal layer 3. FIG. 15 uses the double-pointed arrows in dotted line to point the direction of the lateral electric field E with the arrow direction, and to indicate the intensity of the lateral electric field E to be applied with the line thickness. FIG. 15 also uses the single-pointed arrows in solid line to point the rotation direction of the liquid crystal molecules 3m.

When a voltage is applied between the pixel electrode and the common electrode in the liquid crystal display panel of Example 3, the lateral electric field E that is directed in the direction orthogonal to the stretching direction (first stretching direction) of each slit is applied to the liquid crystal layer 3 at the center of the pixel (portion containing the point NP). The rotation direction of the liquid crystal molecules 3m at the center of the pixel (forward direction) is clockwise at this point.

The direction of the lateral electric field E at the point BP, which is located between a portion where the slit 23 switches from the first stretching direction to the second stretching direction and the edge of the pixel electrode 14, is substantially orthogonal to the second stretching direction of the slit 23 as illustrated in FIG. 15. Therefore, the liquid crystal molecules 3m at and around the point BP, too, rotate in the forward direction.

On the other hand, in a portion that is near the edge of the pixel electrode 14 and does not overlap with the pixel electrode 14 in plan view, the oblique electric field E that rotates the liquid crystal molecules 3m in the forward direction is generated at the point EP which is located in a portion where an angle formed by the edge of the common electrode 16 and the edge of the pixel electrode 14 is an acute angle, and the oblique electric field E that rotates the liquid crystal molecules 3m in the backward direction is generated at the point REP which is located in a portion where the angle formed by the edge of the common electrode 16 and the edge of the pixel electrode 14 is an obtuse angle. However, the oblique electric field E at and around the point REP is smaller in intensity than the oblique electric fields E at the point BP and the point EP. The backward rotation of the liquid crystal molecules 3m at and around the point REP is therefore inhibited. In short, in the liquid crystal display panel of Example 3, too, the backward rotation of the liquid crystal molecules 3m at a pixel end is inhibited and the generation of the pixel end domain 24 is consequently prevented.

Figure 16:
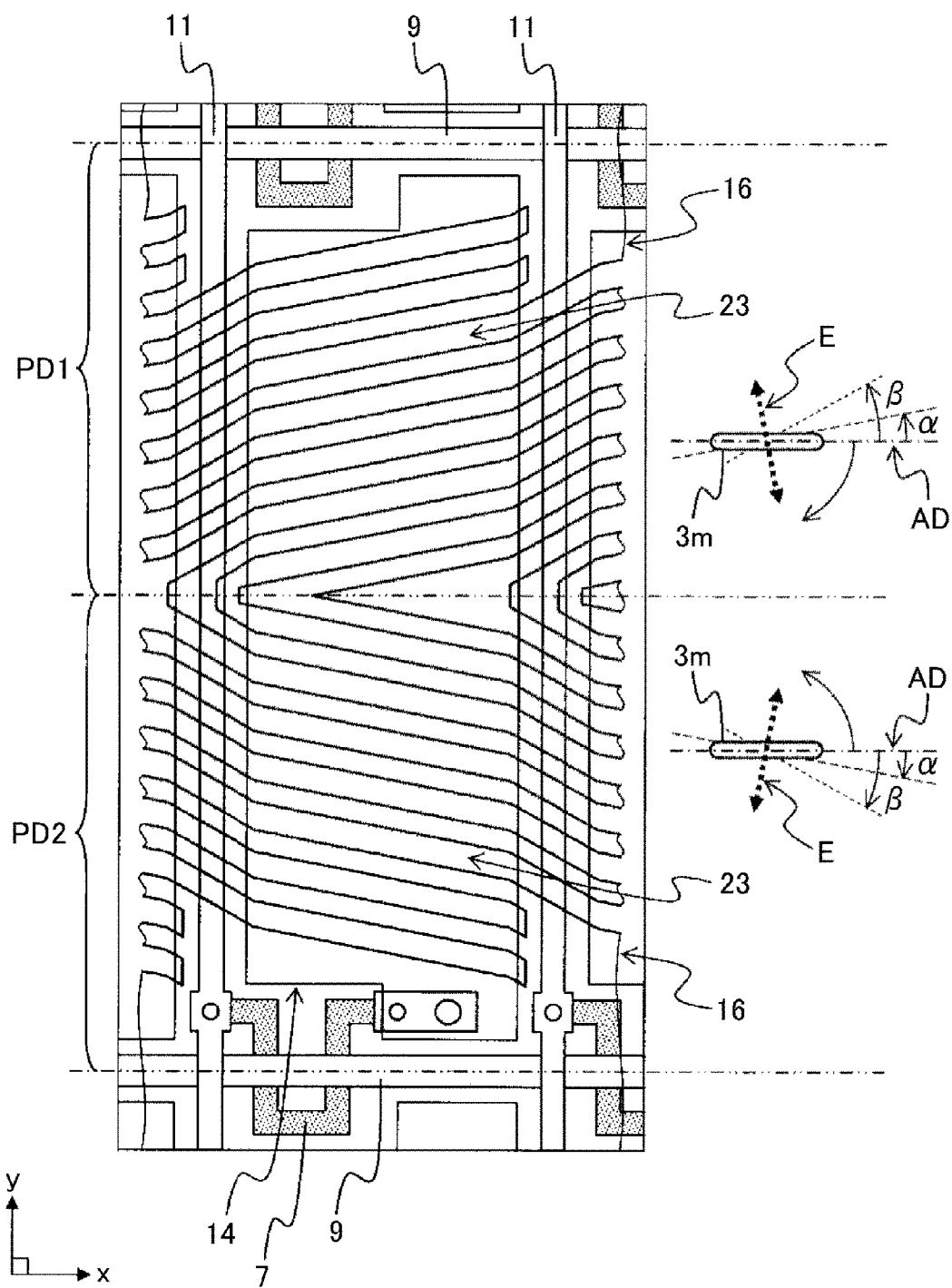
FIG. 16 is a schematic diagram illustrating an application example of the IPS-Pro liquid crystal display panel of Example 3.

FIG. 16 is a schematic diagram illustrating an application example of the IPS-Pro liquid crystal display panel of Example 3.

The liquid crystal display panel of Example 3 changes the relation between the first stretching direction and the second stretching direction in the slits 23 which stretch over a plurality of pixels, to thereby set the initial alignment direction AD of the liquid crystal layer 3 in the shorter side direction of the pixel (x-axis direction). The liquid crystal display panel of Example 3 can therefore be modified, for example, as illustrated in FIG. 16. In FIG. 16, a single pixel is divided in half into an upper half area PD1 and a lower half area PD2, between which the first stretching direction and second stretching direction of the slits 23 are symmetrical. This makes the rotation direction of the liquid crystal molecules 3m in the upper half area PD1 of the pixel and the rotation direction of the liquid crystal molecules 3m in the lower half area PD2 of the pixel opposite to each other when a voltage is applied.

The optical characteristics of a liquid crystal layer in an IPS liquid crystal display device when a voltage is applied are approximated by a rotating uniaxial anisotropic medium. In this case, while the optical axis is always within the liquid crystal layer, changes accompanying polar angle changes of the hue and of the transmittance tend to be more prominent in an orientation that contains the optical axis direction than in other orientations. By disposing two areas PD1 and PD2 which have different optical axis orientations inside a single pixel, the respective viewing angle characteristics of the areas PD1 and PD2 are canceled and better viewing angle characteristics are obtained.

A concrete description of the present invention has been given through the examples described above. However, the present invention is not limited to the examples and various modifications can be made without departing from the spirit of the present invention.

What is claimed is:

1. A liquid crystal display device, comprising a liquid crystal display panel, the liquid crystal display panel comprising:
   a liquid crystal layer having a homogeneous alignment when no electric field is applied; and
   a pair of substrates sandwiching the liquid crystal layer, one of the pair of substrates comprising a plurality of pixel electrodes, which are arranged in a matrix pattern, and a common electrode, which is disposed between the plurality of pixel electrodes and the liquid crystal layer, the common electrode having a stripe structure with a plurality of slits formed in each area where the common electrode and the plurality of pixel electrodes overlap in plan view,
   wherein at least some of the plurality of slits stretch over at least two adjacent pixel electrodes,
   wherein the slits that stretch over at least two adjacent pixel electrodes have a first stretching direction at a center of one of the at least two adjacent pixel electrodes, and a second stretching direction in a gap between adjoining two of the at least two adjacent pixel electrodes, and the first stretching direction and the second stretching direction differ from each other,
   wherein, in the slits that stretch over at least two adjacent pixel electrodes, a portion where the first stretching direction is switched to the second stretching direction is located on one of the at least two adjacent pixel electrodes, and
   wherein, with respect to a direction of an alignment of the liquid crystal layer when no electric field is applied, a first azimuth on an acute angle side toward the first stretching direction and a second azimuth on an acute angle side toward the second stretching direction have the same rotation direction, and the second azimuth is larger than the first azimuth.

2. The liquid crystal display device according to claim 1, wherein the liquid crystal display panel has a display area which comprises a plurality of pixels, the plurality of pixels comprising the plurality of pixel electrodes, the liquid crystal layer, and the common electrode, the plurality of pixels having a rectangular shape in plan view, the plurality of pixels having shorter sides in a direction substantially parallel to the first stretching direction of the slits that stretch over at least two adjacent pixel electrodes.

3. The liquid crystal display device according to claim 1, wherein the slits that stretch over two adjacent pixels are each positioned in a manner that shifts a position of the slit at a border between the two adjacent pixels in a direction orthogonal to the first stretching direction by a height of a single slit.

4. The liquid crystal display device according to claim 1, wherein the slits that stretch over at least two adjacent pixel electrodes span a number of pixels which is smaller than a number of slits that run above a single pixel electrode.

5. The liquid crystal display device according to claim 4, wherein the liquid crystal display panel has a display area which comprises a cyclic arrangement of a set of a first pixel, which controls a luminance of red-base color light, a second pixel, which controls a luminance of green-base color light, and a third pixel, which controls a luminance of blue-base color light, and
   wherein the slits that stretch over at least two adjacent pixel electrodes have ends at a border between the first pixel and the third pixel.

6. The liquid crystal display device according to claim 1, wherein the liquid crystal display panel has a display area which comprises a plurality of pixels, the plurality of pixels comprising the plurality of pixel electrodes, the liquid crystal layer, and the common electrode, the plurality of pixels having a rectangular shape in plan view, and
   wherein the direction of the alignment of the liquid crystal layer when no electric field is applied is substantially parallel to a direction of shorter sides of the plurality of pixels.

* * * * *